(12) United States Patent
Qu et al.

(10) Patent No.: US 10,774,928 B2
(45) Date of Patent: *Sep. 15, 2020

(54) THREE-GEAR AUTOMATIC TRANSMISSION FOR ELECTRIC VEHICLE WITH A BRUSHLESS CONTROL-BY-WIRE CENTRIFUGAL BALL ARM ENGAGEMENT DEVICE

(71) Applicant: Shandong University of Technology, Zibo (CN)

(72) Inventors: Jinyu Qu, Zibo (CN); Jihua Wang, Zibo (CN); Jinju Shao, Zibo (CN); Chuanbo Ren, Zibo (CN); Pan Zhang, Zibo (CN)

(73) Assignee: Shandong University of Technology, Shandong (CN)

( * ) Notice: Subject to any disclaimer, the term of this patent is extended or adjusted under 35 U.S.C. 154(b) by 228 days.

This patent is subject to a terminal disclaimer.

(21) Appl. No.: 15/772,354

(22) PCT Filed: May 22, 2017

(86) PCT No.: PCT/CN2017/085309
§ 371 (c)(1),
(2) Date: Apr. 30, 2018

(87) PCT Pub. No.: WO2018/126592
PCT Pub. Date: Jul. 12, 2018

(65) Prior Publication Data
US 2020/0088295 A1     Mar. 19, 2020

(30) Foreign Application Priority Data
Jan. 9, 2017   (CN) .......................... 2017 1 0014878

(51) Int. Cl.
*F16H 61/32* (2006.01)
*F16H 63/30* (2006.01)

(52) U.S. Cl.
CPC ............ *F16H 61/32* (2013.01); *F16H 63/30* (2013.01); *F16H 2061/326* (2013.01);
(Continued)

(58) Field of Classification Search
CPC .. F16H 61/32; F16H 63/30; F16H 2200/0021; F16H 2061/326;
(Continued)

(56) References Cited

U.S. PATENT DOCUMENTS

| 5,603,671 A | 2/1997 | Schmidt |
| 6,742,640 B1 * | 6/2004 | Grogg ..................... F16D 7/022 |
| | | 192/35 |

(Continued)

FOREIGN PATENT DOCUMENTS

| CN | 103867657 A | 6/2014 |
| CN | 105090385 A | 11/2015 |

(Continued)

*Primary Examiner* — Victor L MacArthur
(74) *Attorney, Agent, or Firm* — Thorpe North and Western, LLP; Jason Jones

(57) ABSTRACT

The present invention discloses a three-gear automatic transmission for electric vehicle with a brushless control-by-wire centrifugal ball arm engagement device. One brushless control-by-wire centrifugal ball arm engagement device is provided between each gear input gear and each gear driving gear; and by controlling the engagement and disengagement of the brushless control-by-wire centrifugal ball arm engagement device, the shift control of the three-gear automatic transmission for electric vehicle with a brushless control-by-wire centrifugal ball arm engagement device is performed. The present invention has such advantages as compact structure, being capable of dynamic gear-shift, no mechanical or hydraulic gear-shift components and low operational energy consumption.

4 Claims, 2 Drawing Sheets

(52) U.S. Cl.
CPC ............... *F16H 2200/0021* (2013.01); *F16H 2200/0039* (2013.01); *F16H 2306/50* (2013.01)

(58) Field of Classification Search
CPC ......... F16H 2200/0039; F16H 2306/50; F16H 3/097; F16H 59/02; F16H 61/14
USPC .................................................. 74/329–331
See application file for complete search history.

(56) References Cited

U.S. PATENT DOCUMENTS

| | | | | |
|---|---|---|---|---|
| 6,830,141 | B1* | 12/2004 | Neelakantan | F16D 23/12 188/158 |
| 2004/0231946 | A1* | 11/2004 | Neelakantan | F16D 23/12 192/84.6 |
| 2012/0241275 | A1* | 9/2012 | Simon | F16D 13/04 192/35 |
| 2016/0325622 | A1* | 11/2016 | McNally | B60K 17/3467 |
| 2018/0080508 | A1* | 3/2018 | Nahrwold | F16D 15/00 |
| 2018/0251028 | A1* | 9/2018 | Engerman | B60K 17/02 |
| 2019/0128339 | A1* | 5/2019 | Finkenzeller | F16D 27/004 |

FOREIGN PATENT DOCUMENTS

| | | | |
|---|---|---|---|
| CN | 204921865 | U | 12/2015 |
| CN | 105276101 | A | 1/2016 |
| CN | 106545651 | A | 3/2017 |
| CN | 206361138 | U | 7/2017 |

\* cited by examiner

THREE-GEAR AUTOMATIC TRANSMISSION FOR ELECTRIC VEHICLE WITH A BRUSHLESS CONTROL-BY-WIRE CENTRIFUGAL BALL ARM ENGAGEMENT DEVICE

The present application claims priority to a Chinese patent application No. 201710014878.4, filed on Jan. 9, 2017, with a title of a three-gear automatic transmission for electric vehicle with a brushless control-by-wire centrifugal ball arm engagement device, which is incorporated herein by reference in its entirety.

FIELD

The present invention is involved in the field of automobile power transmission and relates to an automobile automatic transmission, and more particularly, to a three-gear automatic transmission for electric vehicle with a brushless control-by-wire centrifugal ball arm engagement device.

BACKGROUND

Automatic transmission is widely used in automobiles, electric vehicle, construction machinery and the like. The conventional automatic transmission can be classified mainly as the following four types: Automatic Transmission (AT), Continuously Variable Transmission (CVT), Automated Manual Transmission (AMT) and Dual Clutch Transmission (DCT). The shifting process of above four types of automatic transmission are all controlled by an electrically controlled hydraulic servo device comprising a hydraulic pump, a plurality of hydraulic valves, a plurality of hydraulic clutches and a plurality of brakes, etc, which involves complex structure, high cost and high energy consumption.

With widespread application of such technologies as automobile electronic, automatic control and automobile network communication, the X-by-wire technique has become the tendency of vehicle development in the future. The X-by-wire technique is one that replaces mechanical and hydraulic system with electric wires, electronic controllers and wire control actuators by converting the driver's manipulation into electrical signals with a sensor; the electrical signals is input to an electric control unit where a control signal is generated to drive wire control actuators to perform a desired operation. Therefore, developing a new X-by-wire automatic transmission helps reduce the number of parts, cost and energy consumption and improve transmission efficiency.

A Chinese patent application No. CN201410469568.8 titled "multi-speed ring-arranged control-by-wire automatic transmission" and a patent application No. CN201410468564.8 titled "the double-level multi-speed control-by-wire automatic transmission" was published on Jan. 21, 2015; a Chinese patent application No. CN201410469720.2 titled "electric vehicle three-gear control-by-wire automatic transmission" and a patent application No. CN201410471726.3 titled "electric vehicle multi-speed control-by-wire automatic transmission" was published on Mar. 4, 2015; a Chinese patent application No. CN201520311494.5 titled "multi-speed control-by-wire automatic transmission" was published on Oct. 28, 2015. The published patents above have no hydraulic shifting elements, with the transmission gears of each gear normally engaged, and on the transmission path of each gear, there is provided an electromagnetic clutch respectively, whose engagement and disengagement are controlled by an electric control unit, thereby performing a shift-by-wire process. However, in each of the above patents, the electromagnetic clutch used in the shift-by-wire process has such disadvantages as bulky volume, low rotation speed and requirement for large power consumption. Therefore, the X-by-wire automatic transmission is large in size, low in rotational speed and large in the operation energy consumption.

SUMMARY

It is an object of the present invention to overcome the shortcomings of the conventional automatic transmissions by providing a novel three-gear automatic transmission for electric vehicle with a brushless control-by-wire centrifugal ball arm engagement device which can not only perform power shifting, but also has a simple structure, low cost and low operating energy consumption. The technical solutions of the present invention are as follows:

A three-gear automatic transmission for electric vehicle with a brushless control-by-wire centrifugal ball arm engagement device, which comprises an input shaft, an output shaft, an input gear, an input gear of first gear, an input gear of second gear, a driving gear of first gear and a driving gear of second gear; said input gear is fixedly mounted on the input shaft, and normally engaged with the input gear of first gear and the input gear of second gear respectively along its outer circumference the three-gear automatic transmission is characterized in that: the three-gear automatic transmission further comprises three brushless control-by-wire centrifugal ball arm engagement devices, a brushless electromagnet of first gear, a brushless electromagnet of second gear and a brushless electromagnet of third gear.

The brushless control-by-wire centrifugal ball arm engagement device each comprises a thrust pressing disc, a driven inner-spline hub, a control-by-wire driving disc, a preloading spring, a centrifugal ball arm hollow disc, centrifugal ball arm pins, centrifugal ball aims, centrifugal balls, a magnetic conductive force transmitting disk, centrifugal ball sockets and a drive shaft; the centrifugal ball arm hollow disc is rotatably supported on the drive shaft by a bearing, and is provided with outer-spline grooves of centrifugal ball arm hollow disc on the outer circumferential surface of its one end; the control-by-wire drive disc is arranged on the outer-spline grooves of centrifugal ball arm hollow disc by its inner-spline grooves; the preloading spring is disposed between the end of the outer-spline grooves of centrifugal ball arm hollow disc and the inside end face of the control-by-wire drive disc; the control-by-wire drive disc is provided with a friction driving end face; the centrifugal ball arm hollow disc is provided with a plurality of centrifugal ball arm holders which are evenly arranged in the circumferential direction at its other end, the centrifugal ball arm holders each having one centrifugal ball arm pin fixedly mounted thereon; the centrifugal ball arm has one end mounted on the intermediate journal of the centrifugal ball arm pin by its smooth bearing hole and is rotatable freely around the centrifugal ball arm pin; the centrifugal ball arm has the other end provided with one centrifugal ball socket, in each of which a centrifugal ball is provided and capable of rolling freely.

The thrust pressing disc has one end face being a smooth end surface, on which the centrifugal ball each abuts against, and further has outer-spline grooves provided on its outer circumferential surface; the outer-spline grooves of the thrust pressing disc is axially in sliding engagement with the inner-spline grooves of the driven inner-spline hub.

The magnetic conductive force transmitting disk is fixedly mounted on the journal of the drive shaft by a bearing hole of the center inner hub of magnetic conductive force transmitting disk; the magnetic conductive force transmitting disk is provided with an outer disc of magnetic conductive force transmitting disk.

One brushless control-by-wire centrifugal ball arm engagement device, as the power transmission engagement device for the first gear, is provided between the input gear of first gear and the driving gear of first gear; one end of the drive shaft of the brushless control-by-wire centrifugal ball arm engagement device is connected to one end of the input gear of first gear; said brushless electromagnet of first gear is provided between the brushless control-by-wire centrifugal ball arm engagement device and the input gear of first gear.

One brushless control-by-wire centrifugal ball arm engagement device, as the power transmission engagement device for the second gear, is provided between the input gear of second gear and the driving gear of second gear; one end of the drive shaft of the brushless control-by-wire centrifugal ball arm engagement device is connected to the input gear of second gear; said brushless electromagnet of second gear is provided between the brushless control-by-wire centrifugal ball arm engagement device and the input gear of second gear.

One brushless control-by-wire centrifugal ball arm engagement device, as the power transmission engagement device for the third gear, is provided between the input gear and the output shaft; one end of the drive shaft of the brushless control-by-wire centrifugal ball arm engagement device is connected to one end of the input shaft; said brushless electromagnet of third gear is provided between the brushless control-by-wire centrifugal ball arm engagement device and the input gear.

The brushless electromagnet of first gear, the brushless electromagnet of second gear and the brushless electromagnet of third gear are all fixedly mounted on a transmission housing by a non-magnetic conductive material.

The end face of magnetic pole of said brushless electromagnet of first gear always keeps an air gap from the opposite end face of the outer disc of magnetic conductive force transmitting disk of the brushless control-by-wire centrifugal ball arm engagement device as the power transmission device for the first gear; when said brushless electromagnet of first gear is deenergized, the friction driving end face of the control-by-wire drive disc of the brushless control-by-wire centrifugal ball arm engagement device as the power transmission device for the first gear keeps an air gap from an end face of the outer disc of magnetic conductive force transmitting disk of the brushless control-by-wire centrifugal ball arm engagement device as the power transmission device for the first gear, by the action of the elastic force of the preloading spring of the brushless control-by-wire centrifugal ball arm engagement device as the power transmission device for the first gear; when said brushless electromagnet of first gear is energized, the friction driving end face of the control-by-wire drive disc of the brushless control-by-wire centrifugal ball arm engagement device as the power transmission device for the first gear is engaged together with an end face of the outer disc of magnetic conductive force transmitting disk of the brushless control-by-wire centrifugal ball arm engagement device as the power transmission device for the first gear, by counteracting the action of the elastic force of the preloading spring of the brushless control-by-wire centrifugal ball arm engagement device as the power transmission device for the first gear.

The end face of magnetic pole of said brushless electromagnet of second gear always keeps an air gap from the opposite end face of the outer disc of magnetic conductive force transmitting disk of the brushless control-by-wire centrifugal ball arm engagement device as the power transmission device for the second gear; when said brushless electromagnet of second gear is deenergized, the friction driving end face of the control-by-wire drive disc of the brushless control-by-wire centrifugal ball arm engagement device as the power transmission device for the second gear keeps an air gap from an end face of the outer disc of magnetic conductive force transmitting disk of the brushless control-by-wire centrifugal ball arm engagement device as the power transmission device for the second gear, by the action of the elastic force of the preloading spring of the brushless control-by-wire centrifugal ball arm engagement device as the power transmission device for the second gear; when said brushless electromagnet of second gear is energized, the friction driving end face of the control-by-wire drive disc of the brushless control-by-wire centrifugal ball arm engagement device as the power transmission device for the second gear is engaged together with an end face of the outer disc of magnetic conductive force transmitting disk of the brushless control-by-wire centrifugal ball arm engagement device as the power transmission device for the second gear, by counteracting the action of the elastic force of the preloading spring of the brushless control-by-wire centrifugal ball arm engagement device as the power transmission device for the second gear.

The end face of magnetic pole of said brushless electromagnet of third gear always keeps an air gap from the opposite end face of the outer disc of magnetic conductive force transmitting disk of the brushless control-by-wire centrifugal ball arm engagement device as the power transmission device for the third gear; when said brushless electromagnet of third gear is deenergized, the friction driving end face of the control-by-wire drive disc of the brushless control-by-wire centrifugal ball arm engagement device as the power transmission device for the third gear keeps an air gap from an end face of the outer disc of magnetic conductive force transmitting disk of the brushless control-by-wire centrifugal ball arm engagement device as the power transmission device for the third gear, by the action of the elastic force of the preloading spring of the brushless control-by-wire centrifugal ball arm engagement device as the power transmission device for the third gear; when said brushless electromagnet of third gear is energized, the friction driving end face of the control-by-wire drive disc of the brushless control-by-wire centrifugal ball arm engagement device as the power transmission device for the third gear is engaged together with an end face of the outer disc of magnetic conductive force transmitting disk of the brushless control-by-wire centrifugal ball arm engagement device as the power transmission device for the third gear, by counteracting the action of the elastic force of the preloading spring of the brushless control-by-wire centrifugal ball arm engagement device as the power transmission device for the third gear.

Compared with the prior art, the present invention has the following advantages:

(1) the three-gear automatic transmission for electric vehicle with a brushless control-by-wire centrifugal ball arm engagement device according to the present invention eliminates the hydraulic system and shifting mechanism of a conventional automatic transmission by adopting a brushless control-by-wire centrifugal ball arm engagement device, whose gear shifting process is performed by using an electronic control unit to control the on-off of the current in an electromagnetic coil of a centrifugal ball arm engagement device in a X-by-wire way, which has the advantages of simple structure, low cost and low operational energy consumption.

(2) the brushless control-by-wire centrifugal ball arm engagement device for each gear according to the invention propels a friction disk and a steel disk to be engaged frictionally by utilizing great centrifugal force generated by the centrifugal ball arm of each gear in high-speed operation. It has the advantage of high transmission torque, high speed, no impact during engagement and smooth gear shifting.

REFERENCE NUMBERS 1 input gear, 1Z input shaft, 1WT brushless electromagnet of first gear, 2WT brushless electromagnet of second gear, 3WT brushless electromagnet of third gear, 2A driven gear of first gear, 2B driven gear of second gear, 2Z output shaft, 10 brushless control-by-wire centrifugal ball arm engagement devices, 10a inner-spline-groove friction discs, 10b outer-spline-groove steel sheets, 10c thrust pressing disc, 10ca smooth surface, 10d driven inner-spline hub, 10e end cover of driven inner-spline hub, 10f locking disc, 10g control-by-wire drive disc, 10ga friction driving end face, 10i preloading spring, 10j centrifugal ball arm hollow disc, 10ja outer-spline-grooves of centrifugal ball arm hollow disc, 10k centrifugal ball aim pins, 10l centrifugal ball arms, 10m centrifugal balls, 10p centrifugal ball arm return springs, 10q magnetic conductive force transmitting disk, 10qa center hub of magnetic conductive force transmitting disk, 10qb outer disc of magnetic conductive force transmitting disk, 10r centrifugal ball sockets, 10Z drive shaft, 11 input gear of first gear, 12 input gear of second gear, 21 driving gear of first gear, 21P first gear shaft connecting disc, 21Z first gear shaft, 22 driving gear of second gear, 22P second gear shaft connecting disc, 22Z second gear shaft, 23P output shaft connecting disc.

DETAILED DESCRIPTION

The embodiments of the present invention will now be described in detail with reference to the accompanying drawings in the embodiments of the present invention. It is obvious that the described embodiments are merely some but not all embodiments of the present invention; all the other embodiments derived by those skilled people in the art based on the embodiment of the present invention without making any creative efforts fall into the protection scope of the present invention.

Figure 1:
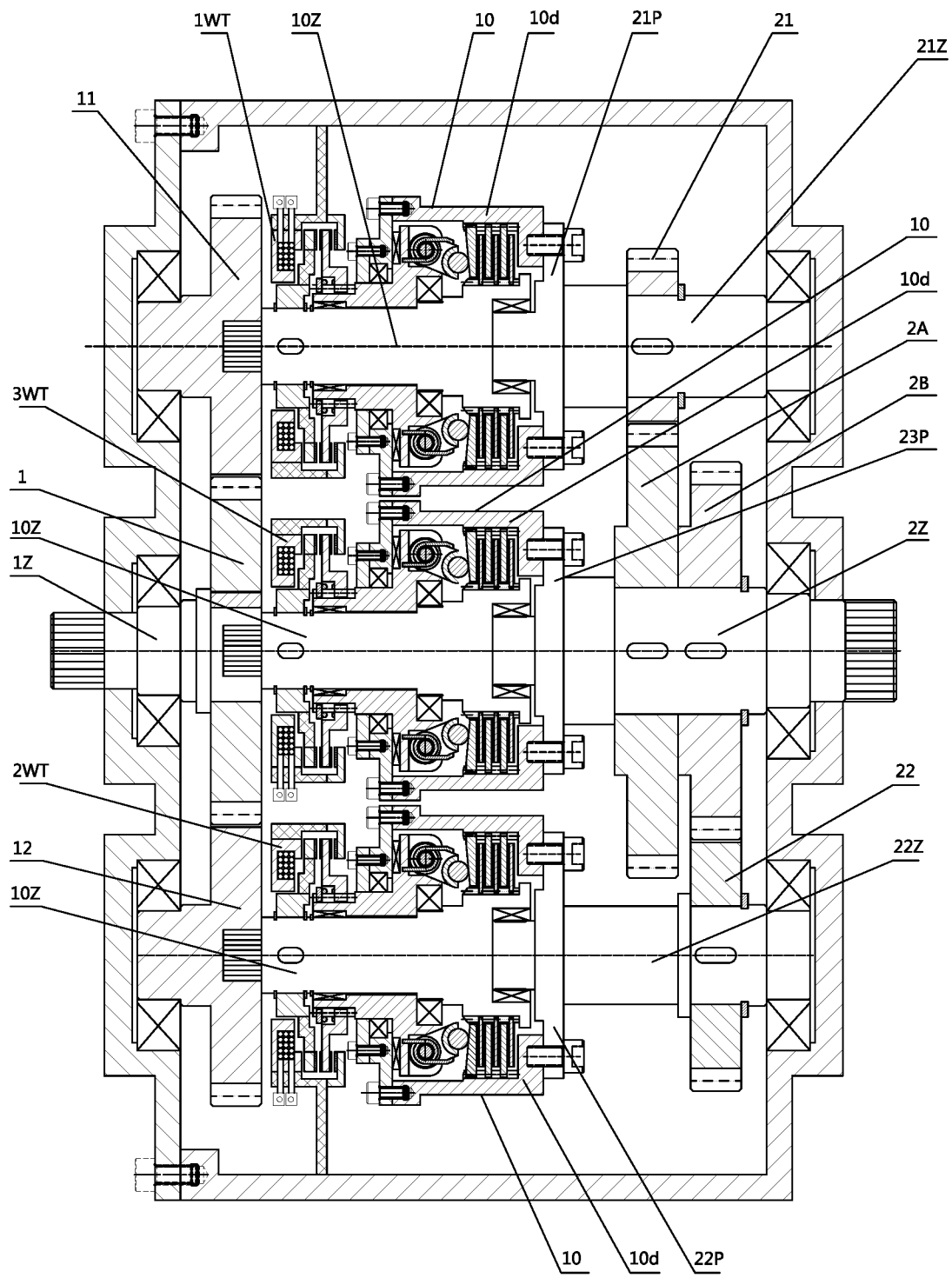
FIG. 1 is a structural diagram of the three-gear automatic transmission for electric vehicle with a brushless control-by-wire centrifugal ball arm engagement device according to an embodiment of the present invention.

As shown in FIG. 1, the three-gear automatic transmission for electric vehicle with a brushless control-by-wire centrifugal ball arm engagement device according to the present invention comprises an input shaft 1Z, an output shaft 2Z, an input gear 1, an input gear of first gear 11, an input gear of second gear 12, a driving gear of first gear 21, a driving gear of second gear 22; the input gear 1 is fixedly mounted on the input shaft 1Z, and normally engaged with the input gear of first gear 11 and the input gear of second gear 12 respectively along its outer circumference, and further comprises three brushless control-by-wire centrifugal ball arm engagement devices 10, a brushless electromagnet of first gear 1WT, a brushless electromagnet of second gear 2WT and a brushless electromagnet of third gear 3WT.

Figure 2:
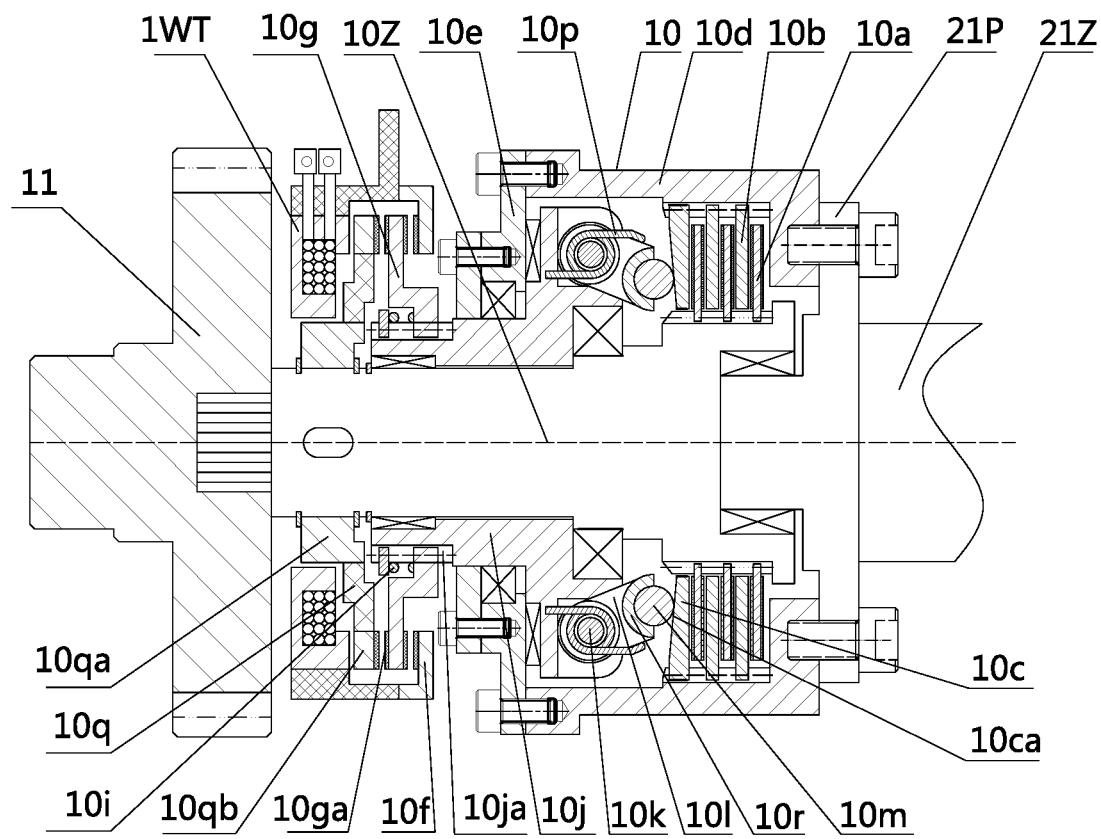
FIG. 2 is a structural diagram of the brushless control-by-wire centrifugal ball arm engagement device of the power transmission device for each gear according to an embodiment of the present invention (taking the first gear as an example).

As shown in FIG. 2, the brushless control-by-wire centrifugal ball arm engagement device 10 each comprises inner-spline-groove friction discs 10a, outer-spline-groove steel sheets 10b, a thrust pressing disc 10c, a driven inner-spline hub 10d, an end cover of driven inner-spline hub 10e, a locking disc 10f, a control-by-wire drive disc 10g, a preloading spring 10i, a centrifugal ball arm hollow disc 10j, centrifugal ball arm pins 10k, centrifugal ball arms 10l, centrifugal balls 10m, centrifugal ball arm return springs 10p, a magnetic conductive force transmitting disk 10q, centrifugal ball sockets 10r and a drive shaft 10Z.

The inner-spline-groove friction discs 10a are sheathed on the outer-spline grooves of the drive shaft 10Z by means of its inner-spline grooves; the outer-spline-groove steel sheets 10b are sheathed on the inner-spline grooves of the driven inner-spline hub 10d by its outer-spline grooves; the thrust pressing disc 10c has one end face being a smooth surface 10ca, and has the other end face being a rough friction surface; on the outer circumferential surface, the thrust pressing disc 10c is further provided with outer-spline grooves which are axially in sliding engagement with the inner-spline grooves of the driven inner-spline hub 10d; the centrifugal ball arm hollow disc 10j is rotatably supported on the drive shaft 10Z by a bearing, and is provided with outer-spline grooves of centrifugal ball arm hollow disc 10ja on the outer circumferential surface of its one end, with the control-by-wire drive disc 10g being arranged on the outer-spline grooves of centrifugal ball arm hollow disc 10ja by its inner-spline grooves and being provided with a friction driving end face 10ga; the centrifugal ball arm hollow disc 10j is provided with a plurality of centrifugal ball arm holders which are evenly arranged in the circumferential direction at its other end, the centrifugal ball arm holders each having one centrifugal ball arm pin 10k fixedly mounted thereon; the centrifugal ball arm 10l has one end mounted on the intermediate journal of the centrifugal ball arm pin 10k by its smooth bearing hole and is rotatable freely around the centrifugal ball arm pin 10k, the centrifugal ball arm 10l has the other end provided with one centrifugal ball socket 10r, in each of which a centrifugal ball 10m is provided and capable of rolling freely; the magnetic conductive force transmitting disk 10q is fixedly mounted on the journal of the drive shaft 10Z by a bearing hole of the center hub of magnetic conductive force transmitting disk 10qa; the magnetic conductive force transmitting disk 10q is provided with an outer disc of magnetic conductive force transmitting disk 10qb.

As shown in FIG. 1 and FIG. 2, one brushless control-by-wire centrifugal ball arm engagement device 10, as the power transmission engagement device for the first gear, is provided between the input gear of first gear 11 and the driving gear of first gear 21, the drive shaft 10Z of the brushless control-by-wire centrifugal ball arm engagement device 10 having one end connected to one end of the input gear of first gear 11 by a spline, and the other end connected to the front journal of the first gear shaft 21Z by a bearing; the driven inner-spline hub 10d of the brushless control-by-wire centrifugal ball arm engagement device 10 has one end, which is close to the input gear for first gear 11, fixedly connected to the end cover of driven inner-spline hub 10e of the brushless control-by-wire centrifugal ball arm engagement device 10 by bolts, and has the other end, which is away from the input gear of first gear 11, fixedly connected to the first gear shaft connecting disc 21P; said brushless electromagnet of first gear 1WT is provided between the brushless control-by-wire centrifugal ball arm engagement device 10 and the input gear of first gear 11; the locking disk 10f of the brushless control-by-wire centrifugal ball arm engagement device 10 and the brushless electromagnet of first gear 1WT are fixedly mounted on the transmission housing by a non-magnetic conductive material; the outer disc of magnetic conductive force transmitting disk 10qb of the brushless control-by-wire centrifugal ball arm engagement device 10 always keeps an air gap from the end face of magnetic pole of said brushless electromagnet of first gear 1WT; when said brushless electromagnet of first gear 1WT is deenergized, the friction driving end face 10ga of the control-by-wire drive disc 10g of the brushless control-by-wire centrifugal ball arm engagement device 10 keeps an air gap from an end face of the outer disc of magnetic conductive force transmitting disk 10qb of the brushless control-by-wire centrifugal ball arm engagement device 10, by the action of the elastic force of the preloading spring 10i of the brushless control-by-wire centrifugal ball arm engagement device 10; when said brushless electromagnet of first gear 1WT is energized, the friction driving end face 10ga of the control-by-wire drive disc 10g of the brushless control-by-wire centrifugal ball arm engagement device 10 is engaged together with an end face of the outer disc of magnetic conductive force transmitting disk 10qb of the brushless control-by-wire centrifugal ball arm engagement device 10.

One brushless control-by-wire centrifugal ball arm engagement device 10, as the power transmission engagement device for the second gear, is provided between the input gear of second gear 12 and the driving gear of second gear 22, the drive shaft 10Z of the brushless control-by-wire centrifugal ball arm engagement device 10 having one end connected to one end of the input gear of second gear 12 by a spline, and the other end connected to the front journal of the second gear shaft 22Z by a bearing; the driven inner-spline hub 10d of the brushless control-by-wire centrifugal ball arm engagement device 10 has one end, which is close to the input gear for second gear 12, fixedly connected to the end cover of driven inner-spline hub 10e of the brushless control-by-wire centrifugal ball arm engagement device 10 by bolts, and has the other end, which is away from the input gear of second gear 12, fixedly connected to the second gear shaft connecting disc 22P; said brushless electromagnet of second gear 2WT is provided between the brushless control-by-wire centrifugal ball arm engagement device 10 and the input gear of second gear 12; the locking disk 10f of the brushless control-by-wire centrifugal ball arm engagement device 10 has its locking disk 10f and and the brushless electromagnet of second gear 2WT are fixedly mounted on the transmission housing by a non-magnetic conductive material; the outer disc of magnetic conductive force transmitting disk 10qb of the brushless control-by-wire centrifugal ball arm engagement device 10 always keeps an air gap from the end face of magnetic pole of said brushless electromagnet of second gear 2WT; when said brushless electromagnet of second gear 2WT is deenergized, the friction driving end face 10ga of the control-by-wire drive disc 10g of the brushless control-by-wire centrifugal ball arm engagement device 10 keeps an air gap from an end face of the outer disc of magnetic conductive force transmitting disk 10qb of the brushless control-by-wire centrifugal ball arm engagement device 10, by the action of the elastic force of the preloading spring 10i of the brushless control-by-wire centrifugal ball arm engagement device 10; when said brushless electromagnet of second gear 2WT is energized, the friction driving end face 10ga of the control-by-wire drive disc 10g of the brushless control-by-wire centrifugal ball arm engagement device 10 is engaged together with an end face of the outer disc of magnetic conductive force transmitting disk 10qb of the brushless control-by-wire centrifugal ball arm engagement device 10.

One brushless control-by-wire centrifugal ball arm engagement device 10, as the power transmission engagement device for the third gear, is provided between the input gear 1 and the output shaft 2Z, the drive shaft 10Z of the brushless control-by-wire centrifugal ball arm engagement device 10 having one end connected to the input gear 1 by a spline, and the other end connected to the front journal of the output shaft 2Z by a bearing; the driven inner-spline hub 10d of the brushless control-by-wire centrifugal ball arm engagement device 10 has one end, which is close to the input gear 1, fixedly connected to the end cover of driven inner-spline hub 10e of the brushless control-by-wire centrifugal ball arm engagement device 10 by bolts, and has the other end, which is away from the input gear 1, fixedly connected to the output shaft connecting disc 23P; said brushless electromagnet of third gear 3WT is provided between the brushless control-by-wire centrifugal ball arm engagement device 10 and the input gear 1; the locking disk 10f of the brushless control-by-wire centrifugal ball arm engagement device 10 and the brushless electromagnet of third gear 3WT are fixedly mounted on the transmission housing by a non-magnetic conductive material; the outer disc of magnetic conductive force transmitting disk 10qb of the brushless control-by-wire centrifugal ball arm engagement device 10 always keeps an air gap from the end face of magnetic pole of said brushless electromagnet of third gear 3WT; when said brushless electromagnet of third gear 3WT is deenergized, the friction driving end face 10ga of the control-by-wire drive disc 10g of the brushless control-by-wire centrifugal ball arm engagement device 10 keeps an air gap from an end face of the outer disc of magnetic conductive force transmitting disk 10qb of the brushless control-by-wire centrifugal ball arm engagement device 10, by the action of the elastic force of the preloading spring 10i of the brushless control-by-wire centrifugal ball arm engagement device 10; when said brushless electromagnet of third gear 3WT is energized, the friction driving end face 10ga of the control-by-wire drive disc 10g of the brushless control-by-wire centrifugal ball arm engagement device 10 is engaged together with an end face of the outer disc of magnetic conductive force transmitting disk 10qb of the brushless control-by-wire centrifugal ball arm engagement device 10.

The driving gear of first gear 21 and the first gear shaft connecting disc 21P are fixedly mounted on the first gear shaft 21Z, with the driving gear of first gear 21 normally engaged with a driven gear of first gear 2A; the driving gear of second gear 22 and the second gear shaft connecting disc 22P are fixedly mounted on the second gear shaft 22Z, with the driving gear of second gear 22 normally engaged with a driven gear of second gear 2B; the output shaft 2Z is fixedly connected to the output shaft connecting disc 23P.

Both the driven gear of first gear 2A and the driven gear of second gear 2B are fixedly mounted on the output shaft 2Z.

In the following, the operation principle of the three-gear automatic transmission for electric vehicle with a brushless control-by-wire centrifugal ball arm engagement device will be further described by taking the first gear control-by-wire automatic transmission as an example.

In case of the first gear power transmission, when the electromagnetic coil of the brushless electromagnet of first gear 1WT is energized, the brushless control-by-wire centrifugal ball arm engagement device 10 as the power transmission engagement device for the first gear is operated, with the electromagnetic coils of other gears all being deenergized meanwhile; after the electromagnetic coil of the brushless electromagnet of first gear 1WT is energized, the electromagnetic attraction force generated by the brushless electromagnet of first gear 1WT is transmitted to the control-by-wire drive disc 10g of the brushless control-by-wire centrifugal ball arm engagement device 10 as the power transmission engagement device for the first gear via the magnetic conductive force transmitting disk 10q of the brushless control-by-wire centrifugal ball arm engagement device 10 as the power transmission engagement device for the first gear, so that the control-by-wire drive disc 10g of the brushless control-by-wire centrifugal ball arm engagement device 10 as the power transmission engagement device for the first gear moves in direction of the brushless electromagnet of first gear 1WT by counteracting the elastic force of the preloading spring 10i of the brushless control-by-wire centrifugal ball arm engagement device 10 as the power transmission engagement device for the first gear, making the friction driving end face 10ga of the brushless control-by-wire centrifugal ball arm engagement device 10 as the power transmission engagement device for the first gear engaged with one end face of the magnetic conductive force transmitting disk 10q of the brushless control-by-wire centrifugal ball arm engagement device 10 as the power transmission engagement device for the first gear, and the friction force generated there between drives the centrifugal ball arm hollow disc 10j of the brushless control-by-wire centrifugal ball arm engagement device 10 as the power transmission engagement device for the first gear to rotate, which further driving each centrifugal ball arm 10l of the brushless control-by-wire centrifugal ball arm engagement device 10 as the power transmission engagement device for the first gear to rotate. Meanwhile, by the action of centrifugal force, each centrifugal ball arm 10l of the brushless control-by-wire centrifugal ball arm engagement device 10 as the power transmission engagement device for the first gear is opened outward around a centrifugal ball arm pin 10k of the brushless control-by-wire centrifugal ball arm engagement device 10 as the power transmission engagement device for the first gear, which making one end provided with the centrifugal ball socket 10r of the brushless control-by-wire centrifugal ball arm engagement device 10 as the power transmission engagement device for the first gear drive the centrifugal ball 10m of the brushless control-by-wire centrifugal ball arm engagement device 10 as the power transmission engagement device for the first gear to make a circular motion outwardly along the smooth surface 10ca of the thrust pressing disk 10c of the brushless control-by-wire centrifugal ball arm engagement device 10 as the power transmission engagement device for the first gear, thereby the centrifugal ball arms 10l of the brushless control-by-wire centrifugal ball arm engagement device 10 as the power transmission engagement device for the first gear generates a centrifugal force along with the centrifugal balls 10m of the brushless control-by-wire centrifugal ball arm engagement device 10 as the power transmission engagement device for the first gear, the component of the centrifugal force in the direction of the central axis of the centrifugal ball arm hollow disc 10j of the brushless control-by-wire centrifugal ball arm engagement device 10 as the power transmission engagement device for the first gear propelling the thrust pressure disc 10c of the brushless control-by-wire centrifugal ball arm engagement device 10 as the power transmission engagement device for the first gear to make an axial movement away from the centrifugal ball arm hollow disc 10j of the brushless control-by-wire centrifugal ball arm engagement device 10 as the power transmission engagement device for the first gear, so that the thrust pressing disc 10c of the brushless control-by-wire centrifugal ball arm engagement device 10 as the power transmission engagement device for the first gear compresses each outer-spline-groove steel sheet 10b of the brushless control-by-wire centrifugal ball arm engagement device 10 as the power transmission engagement device for the first gear and each inner-spline-groove friction disk 10a of the brushless control-by-wire centrifugal ball arm engagement device 10 as the power transmission engagement device for the first gear with each other, the friction force between the outer-spline-groove steel sheets 10b of the brushless control-by-wire centrifugal ball arm engagement device 10 as the power transmission engagement device for the first gear and the inner-spline-groove friction disk 10a of the brushless control-by-wire centrifugal ball arm engagement device 10 as the power transmission engagement device for the first gear allowing the driven inner-spline hub 10d of the brushless control-by-wire centrifugal ball arm engagement device 10 as the power transmission engagement device for the first gear to rotate synchronously along with the drive shaft 10Z of the brushless control-by-wire centrifugal ball arm engagement device 10 as the power transmission engagement device for the first gear, and further allowing the drive shaft 10Z of the brushless control-by-wire centrifugal ball arm engagement device 10 as the power transmission engagement device for the first gear to rotate synchronously with the first gear shaft 21Z, thereby realizing the first gear transmission.

When the electromagnetic coils of the brushless electromagnets for the other gears are deenergized, by the action of the elastic force of the preloading spring 10i of the brushless control-by-wire centrifugal ball arm engagement device 10 as the power transmission engagement device for the other gears, the control-by-wire drive disc 10g of the brushless control-by-wire centrifugal ball arm engagement device 10 as the power transmission engagement device for the other gears is engaged with the locking disc 10f of the brushless control-by-wire centrifugal ball arm engagement device 10 as the power transmission engagement device for the other gears, with the locking disc 10f of the brushless control-by-wire centrifugal ball arm engagement device 10 as the power transmission engagement device for the other gears fixed to the clutch housing by a non-magnetic conductive material, so that the friction force between the two disks after their engagement enables the control-by-wire drive disc 10g of the brushless control-by-wire centrifugal ball arm engagement device 10 as the power transmission engagement device for the other gears and the centrifugal ball arm hollow disc 10j of the brushless control-by-wire centrifugal ball arm engagement device 10 as the power transmission engagement device for the other gears standstill, and the centrifugal ball arms 10l of the brushless control-by-wire centrifugal ball arm engagement device 10 as the power transmission engagement device for the other gears are folded inwardly along with the centrifugal balls 10m of the brushless control-by-wire centrifugal ball arm engagement device 10 as the power transmission engagement device for the other gears by the twisting of the centrifugal ball arm return spring 10p of the brushless control-by-wire centrifugal ball arm engagement device 10 as the power transmission engagement device for the other gears, thereby the brushless control-by-wire centrifugal ball arm engagement devices 10 as the power transmission engagement device for the other gears do not transmit power.

With the brushless electromagnet of first gear 1WT fixed to the housing by a non-magnetic conductive material, the brushless electromagnet of first gear 1WT always keeps a constant air gap from the magnetic conductive force transmitting disk 10q of the brushless control-by-wire centrifugal ball arm engagement device 10 as the power transmission engagement device for the first gear, thereby said first gear transmission process can be performed by a brushless control-by-wire transmission. At the same time, since the electromagnetic force generated by energizing the electromagnetic coil of the brushless electromagnet of first gear 1WT only controls the centrifugal ball arm hollow disc 10j of the brushless control-by-wire centrifugal ball arm engagement device 10 as the power transmission engagement device for the first gear to rotate via the magnetic conductive force transmitting disk 10q and the control-by-wire drive disc 10g of the brushless control-by-wire centrifugal ball arm engagement device 10 as the power transmission engagement device for the first gear, thus, the power consumption of the brushless electromagnet of first gear 1WT is small, which reduces the operation energy consumption of the brushless control-by-wire centrifugal ball arm engagement device 10 as the power transmission engagement device for the first gear.

The control-by-wire power transmissions of the other gears each have the same working principles as the first gear.

The power transmission path of the three-gear automatic transmission for electric vehicle with a brushless control-by-wire centrifugal ball arm engagement device according to the embodiment of the present invention will be further described below with reference to FIG. 1 and FIG. 2.

The power transmission path of the first gear: when the brushless control-by-wire centrifugal ball arm engagement device 10 as the power transmission engagement device for the first gear is energized and engaged, the torque of the motor is transmitted to the input gear 1 through the input shaft 1Z; the input gear 1 transmits the torque to the input gear of first gear 11; the input gear of first gear 11 transmits the torque to the brushless control-by-wire centrifugal ball arm engagement device 10 as the power transmission engagement device for the first gear, and the torque is further transmitted to the first gear shaft connecting disc 21P by the brushless control-by-wire centrifugal ball arm engagement device 10 as the power transmission engagement device for the first gear; the power is then transmitted to the output shaft 2Z by the engagement of the driving gear of first gear 21 and the driven gear of first gear 2A, thereby realizing the reducing transmission of the first gear.

The power transmission path of the second gear: when the brushless control-by-wire centrifugal ball arm engagement device 10 as the power transmission engagement device for the second gear is energized and engaged, the torque of the motor is transmitted to the input gear 1 through the input shaft 1Z; the input gear 1 transmits the torque to the input gear of second gear 12; the input gear of second gear 12 transmits the torque to the brushless control-by-wire centrifugal ball arm engagement device 10 as the power transmission engagement device for the second gear, and the torque is further transmitted to the second gear shaft connecting disc 22P by the brushless control-by-wire centrifugal ball arm engagement device 10 as the power transmission engagement device for the second gear; then the power is transmitted to the output shaft 2Z by the driving gear of second gear 22 and the driven gear of second gear 2B, thereby realizing the reducing transmission of the second gear.

The power transmission path of the third gear: when the brushless control-by-wire centrifugal ball arm engagement device 10 as the power transmission engagement device for the third gear is energized and engaged, the torque of the motor is transmitted to the input gear 1 through the input shaft 1Z, and the torque is further transmitted to the output shaft 2Z by the brushless control-by-wire centrifugal ball arm engagement device 10 as the power transmission engagement device for the third gear, thereby realizing the transmission of the third gear.

The power transmission path of the reverse gear: when the brushless control-by-wire centrifugal ball arm engagement device 10 as the power transmission engagement device for the first gear is energized and engaged, the motor rotates in reverse, then the torque of the motor is transmitted to the input gear 1 through the input shaft 1Z; the input gear 1 transmits the torque to the input gear of first gear 11; the input gear of first gear 11 transmits the torque to the brushless control-by-wire centrifugal ball arm engagement device 10 as the power transmission engagement device for the first gear, and the torque is further transmitted to the first gear shaft connecting disc 21P by the brushless control-by-wire centrifugal ball arm engagement device 10 as the power transmission engagement device for the first gear; then the power is transmitted to the output shaft 2Z by the driving gear of first gear 21 and the driven gear of first gear 2A, thereby realizing the reducing transmission of the reverse gear.

Neutral gear: when the brushless control-by-wire centrifugal ball arm engagement device 10 as the power transmission engagement device for the each gear is deenergized and in non-operating state, the neutral gear is realized.

The embodiments of the present invention are described in detail with reference to the accompanying drawings, but it should be noted that, for those skilled in the art, the present invention is not limited to these embodiments, and improvements and modifications may be made without departing from the gist of the present invention.

The invention claimed is:

1. A three-gear automatic transmission for electric vehicle with a brushless control-by-wire centrifugal ball arm engagement device, which comprises an input shaft (1Z), an output shaft (2Z), an input gearwheel (1), a first-gear input gearwheel (11), a second-gear input gearwheel (12), a first-gear driving gearwheel (21) and a second-gear driving gearwheel (22); the input gearwheel (1) being fixedly mounted on the input shaft (1Z), and normally engaged with the first-gear input gearwheel (11) and the second-gear input gearwheel (12) respectively along an outer circumference of the input gearwheel (1);

the three-gear automatic transmission being characterized in that:
the three-gear automatic transmission further comprises three brushless control-by-wire centrifugal ball arm engagement devices (10), a first-gear brushless electromagnet (1WT), a second-gear brushless electromagnet (2WT) and a third-gear brushless electromagnet (3WT);

the brushless control-by-wire centrifugal ball arm engagement device (10) each comprises a thrust pressing disc (10c), a driven inner-spline hub (10d), a control-by-wire driving disc (10g), a preloading spring (10i), a centrifugal ball arm hollow disc (10j), centrifugal ball arm pins (10k), centrifugal ball arms (10l), centrifugal balls (10m), a magnetic conductive force transmitting disk (10q), centrifugal ball sockets (10r) and a drive shaft (10Z); the centrifugal ball arm hollow disc (10j) is rotatably supported on the drive shaft (10Z) by a bearing, and is provided with outer-spline grooves of centrifugal ball arm hollow disc (10ja) on the outer circumferential surface of one end of the centrifugal ball arm hollow disc (10j); the control-by-wire drive disc (10g) is arranged on the outer-spline grooves of centrifugal ball arm hollow disc (10ja) by inner-spline grooves of the control-by-wire drive disc (10g); the preloading spring (10i) is disposed between the end of the outer-spline grooves of centrifugal ball arm hollow disc (10ja) and the inside end face of the control-by-wire drive disc (10g); the control-by-wire drive disc (10g) is provided with a friction driving end face (10ga); the centrifugal ball arm hollow disc (10j) is provided with a plurality of centrifugal ball arm holders which are evenly arranged in the circumferential direction at the other end of the centrifugal ball arm hollow disc (10j), the centrifugal ball arm holders each having one centrifugal ball arm pin (10k) fixedly mounted thereon; the centrifugal ball arm (10l) has one end mounted on the intermediate journal of the centrifugal ball arm pin (10k) by a smooth bearing hole of the centrifugal ball arm (10l) and is rotatable freely around the centrifugal ball arm pin (10k); the centrifugal ball arm (10l) has the other end provided with one centrifugal ball socket (10r), in each of which a centrifugal ball (10m) is provided and capable of rolling freely;

the thrust pressing disc (10c) has one end face being a smooth end surface (10ca), on which the centrifugal ball (10m) each abuts against, and further has outer-spline grooves provided on an outer circumferential surface of the thrust pressing disc (10c); the outer-spline grooves of the thrust pressing disc (10c) is axially in sliding engagement with the inner-spline grooves of the driven inner-spline hub (10d);

the magnetic conductive force transmitting disk (10q) is fixedly mounted on the journal of the drive shaft (10Z) by a bearing hole of the center inner hub of magnetic conductive force transmitting disk (10qa); the magnetic conductive force transmitting disk (10q) is provided with an outer disc of magnetic conductive force transmitting disk (10qb);

one brushless control-by-wire centrifugal ball arm engagement device (10), as a first-gear power transmission engagement device, is provided between the first-gear input gearwheel (11) and the first-gear driving gearwheel (21); one end of the drive shaft (10Z) of the brushless control-by-wire centrifugal ball arm engagement device (10) is connected to one end of the first-gear input gearwheel (11); the first-gear brushless electromagnet (1WT) being provided between the brushless control-by-wire centrifugal ball arm engagement device (10) and the first-gear input gearwheel (11);

one brushless control-by-wire centrifugal ball arm engagement device (10), as a second-gear power transmission engagement device, is provided between the second-gear input gearwheel (12) and the second-gear driving gearwheel (22); one end of the drive shaft (10Z) of the brushless control-by-wire centrifugal ball arm engagement device (10) is connected to the second-gear input gearwheel (12); the second-gear brushless electromagnet (2WT) being provided between the brushless control-by-wire centrifugal ball arm engagement device (10) and the second-gear input gearwheel (12);

one brushless control-by-wire centrifugal ball arm engagement device (10), as a third-gear power transmission engagement device, is provided between the input gearwheel (1) and the output shaft (2Z): one end of the drive shaft (10Z) of the brushless control-by-wire centrifugal ball arm engagement device (10) is connected to one end of the input shaft (1Z); the third-gear brushless electromagnet (3WT) being provided between the brushless control-by-wire centrifugal ball arm engagement device (10) and the input gearwheel (1);

the first-gear brushless electromagnet (1WT), the second-gear brushless electromagnet (2WT) and the third-gear brushless electromagnet (3WT) are all fixedly mounted on a transmission housing by a non-magnetic conductive material.

2. The three-gear automatic transmission for electric vehicle with a brushless control-by-wire centrifugal ball arm engagement device according to claim 1, wherein, the end face of magnetic pole of the first-gear brushless electromagnet (1WT) always keeps an air gap from the opposite end face of the outer disc of magnetic conductive force transmitting disk (10qb) of the brushless control-by-wire centrifugal ball arm engagement device (10) as a first-gear power transmission device; when the first-gear brushless electromagnet (1WT) is deenergized, the friction driving end face (10ga) of the control-by-wire drive disc (10g) of the brushless control-by-wire centrifugal ball arm engagement device (10) as the first-gear power transmission device keeps an air gap from an end face of the outer disc of magnetic transmitting disk (10qb) of the brushless control-by-wire centrifugal ball arm engagement device (10) as the first-gear power transmission device, by the action of the elastic force of the preloading spring (10i) of the brushless control-by-wire centrifugal ball arm engagement device (10) as the first-gear power transmission device; when the first-gear brushless electromagnet (1WT) is energized, the friction driving end face (10ga) of the control-by-wire drive disc (10g) of the brushless control-by-wire centrifugal ball arm engagement device (10) as the first-gear power transmission device is engaged together with an end face of the outer disc of magnetic conductive force transmitting disk (10qb) of the brushless control-by-wire centrifugal ball arm engagement device (10) as the first-gear power transmission device, by counteracting the action of the elastic force of the preloading spring (10i) of the brushless control-by-wire centrifugal ball arm engagement device (10) as the first-gear power transmission device.

3. The three-gear automatic transmission for electric vehicle with a brushless control-by-wire centrifugal ball arm engagement device according to claim 1, wherein, the end face of magnetic pole of the second-gear brushless electromagnet (2WT) always keeps an air gap from the opposite end face of the outer disc of magnetic conductive force transmitting disk (10*qb*) of the brushless control-by-wire centrifugal ball arm engagement device (10) as a second-gear power transmission device; when the second-gear brushless electromagnet (2WT) is deenergized, the friction driving end face (10*ga*) of the control-by-wire drive disc (10*g*) of the brushless control-by-wire centrifugal ball arm engagement device (10) as the second-gear power transmission device keeps an air gap from an end face of the outer disc of magnetic conductive force transmitting disk (10*qb*) of the brushless control-by-wire centrifugal ball arm engagement device (10) as the second-gear power transmission device, by the action of the elastic force of the preloading spring (10*i*) of the brushless control-by-wire centrifugal ball arm engagement device (10) as the second-gear power transmission device; when the second-gear brushless electromagnet (2WT) is energized, the friction driving end face (10*ga*) of the control-by-wire drive disc (10*g*) of the brushless control-by-wire centrifugal ball arm engagement device (10) as the second-gear power transmission device is engaged together with an end face of the outer disc of magnetic conductive force transmitting disk (10*qb*) of the brushless control-by-wire centrifugal ball arm engagement device (10) as the second-gear power transmission device, by counteracting the action of the elastic force of the preloading spring (10*i*) of the brushless control-by-wire centrifugal ball arm engagement device (10) as the second-gear power transmission device.

4. The three-gear automatic transmission for electric vehicle with a brushless control-by-wire centrifugal ball arm engagement device according to claim 1, wherein, the end face of magnetic pole of the third-gear brushless electromagnet (3WT) always keeps an air gap from the opposite end face of the outer disc of magnetic conductive force transmitting disk (10*qb*) of the brushless control-by-wire centrifugal ball arm engagement device (10) as a third-gear power transmission device; when the third-gear brushless electromagnet (3WT) is deenergized, the friction driving end face (10*ga*) of the control-by-wire drive disc (10*g*) of the brushless control-by-wire centrifugal ball arm engagement device (10) as the third-gear power transmission device keeps an air gap from an end face of the outer disc of magnetic conductive force transmitting disk (10*qb*) of the brushless control-by-wire centrifugal ball arm engagement device (10) as the third-gear power transmission device, by the action of the elastic force of the preloading spring (10*i*) of the brushless control-by-wire centrifugal ball arm engagement device (10) as the third-gear power transmission device; when the third-gear brushless electromagnet (3WT) is energized, the friction driving end face (10*ga*) of the control-by-wire drive disc (10*g*) of the brushless control-by-wire centrifugal ball arm engagement device (10) as the third-gear power transmission device is engaged together with an end face of the outer disc of magnetic conductive force transmitting disk (10*qb*) of the brushless control-by-wire centrifugal ball arm engagement device (10) as the third-gear power transmission device, by counteracting the action of the elastic force of the preloading spring (10*i*) of the brushless control-by-wire centrifugal ball arm engagement device (10) as the third-gear power transmission device.

* * * * *

UNITED STATES PATENT AND TRADEMARK OFFICE
CERTIFICATE OF CORRECTION

PATENT NO. : 10,774,928 B2  
APPLICATION NO. : 15/772354  
DATED : September 15, 2020  
INVENTOR(S) : Jinyu Qu et al.

Page 1 of 1

It is certified that error appears in the above-identified patent and that said Letters Patent is hereby corrected as shown below:

On the Title Page

Item (30), Foreign Application Priority Data has been listed incorrectly. The correct number is: 201710014878.4

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*